United States Patent [19]

Immel et al.

[11] Patent Number: 4,943,549
[45] Date of Patent: Jul. 24, 1990

[54] SUPPORTED RUTHENIUM CATALYST, ITS PREPARATION AND ITS USE IN THE PREPARATION OF OPTIONALLY SUBSTITUTED CYCLOHEXYLAMINE AND OPTIONALLY SUBSTITUTED DICYCLOHEXYLAMINE

[75] Inventors: Otto Immel; Hans-Helmut Schwarz; Reinhard Thiel, all of Krefeld, Fed. Rep. of Germany

[73] Assignee: Bayer Aktiengesellschaft, Leverkusen, Fed. Rep. of Germany

[21] Appl. No.: 376,109

[22] Filed: Jul. 6, 1989

[30] Foreign Application Priority Data

Jul. 21, 1988 [DE] Fed. Rep. of Germany ....... 3824822

[51] Int. Cl.$^5$ .................... B01J 23/10; B01J 23/34; B01J 23/46
[52] U.S. Cl. .................... 502/304; 502/302; 502/303
[58] Field of Search .................... 502/302, 303, 304

[56] References Cited

U.S. PATENT DOCUMENTS

| 2,887,449 | 5/1959 | Janoski | 208/120 |
| 3,972,829 | 8/1976 | Michalko | 502/321 X |
| 3,983,072 | 9/1976 | Stephens | 252/460 |
| 4,055,512 | 10/1977 | Kageyawa et al. | 502/324 X |
| 4,161,492 | 7/1979 | Weissel | 260/563 R |
| 4,172,849 | 10/1979 | Drake | 502/304 X |
| 4,206,134 | 6/1980 | Kugler et al. | 260/449 R |
| 4,299,734 | 11/1981 | Fujitani et al. | 502/304 X |
| 4,639,432 | 1/1987 | Holt et al. | 502/304 X |
| 4,657,885 | 4/1987 | Fiato et al. | 502/304 X |

*Primary Examiner*—Patrick P. Garvin
*Assistant Examiner*—George R. Fourson
*Attorney, Agent, or Firm*—Sprung Horn Kramer & Woods

[57] ABSTRACT

Optionally substituted cyclohexylamine and optionally substituted dicyclohexylamine can be obtained by the catalytic hydrogenation of optionally substituted aniline, a ruthenium catalyst which is supported in $Al_2O_3$ treated with compounds of rare earth metals and of manganese and which has a ruthenium content of 0.05–5% by weight, relative to the total weight of the catalyst, being employed.

9 Claims, No Drawings

SUPPORTED RUTHENIUM CATALYST, ITS PREPARATION AND ITS USE IN THE PREPARATION OF OPTIONALLY SUBSTITUTED CYCLOHEXYLAMINE AND OPTIONALLY SUBSTITUTED DICYCLOHEXYLAMINE

BACKGROUND OF THE INVENTION

1. Field of the Invention

The invention relates to a supported ruthenium catalyst, a process for its preparation and a process for the preparation of optionally substituted cyclohexylamine and optionally substituted dicyclohexylamine by the catalytic hydrogenation of optionally substituted aniline using a catalyst of this type.

2. Description of the Related Art

It is known to prepare cyclohexylamine by pressure hydrogenation of aniline. Cobalt catalysts containing a basic additive (British Pat. No. 969,542) and also Raney cobalt (Japanese Patent 68/03180) are employed for this hydrogenation. A ruthenium catalyst moderated with alkali and supported on an inert material is used, in accordance with U.S. Pat. No. 3,636,108, for the ring-hydrogenation of aromatic amino compounds, $NH_3$ and, if appropriate, a solvent being employed in addition. Another process for the pressure hydrogenation of aniline to cyclohexylamine is described in DE-AS (German Published Specification) 1,106,319, in which a ruthenium catalyst is also used. Dicyclohexylamine formed at the same time is recycled to the feed material in this process; the process causes considerable losses through the simultaneous formation of cyclohexane. Finally, EP 53,818 considers that supported palladium catalysts are more advantageous than ruthenium catalysts for the pressure hydrogenation of aniline.

In the known pressure hydrogenation processes of aniline, dicyclohexylamine is only formed as a by-product together with cyclohexylamine. In order to obtain dicyclohexylamine in larger amounts, it is prepared by separate processes. Thus it can be obtained, for example, by the pressure hydrogenation of diphenylamine using a ruthenium/$Al_2O_3$ catalyst (DE-AS (German Published Specification) 1,106,319). Dicyclohexylamine is also formed in the reaction of cyclohexanone with cyclohexylamine in the presence of palladium-on-charcoal under a hydrogen pressure of 4 bar (French Patent 1,333,692). Dicyclohexylamine can be obtained in a complicated process from the hydrogenation product of aniline over a nickel catalyst by fractional condensing out. Part of the ammonia formed at the same time is removed from the residual mixture, and the remainder is recycled to the reaction (German Patent Specification 805,518).

A common problem in all processes for the ring-hydrogenation of aromatic amines consists in the formation, which in some cases is considerable, of cyclohexane as a waste product which cannot be used further.

It was therefore desired to develop a new process, capable also of being used on an industrial scale, in which both cyclohexylamine and dicyclohexylamine can be produced in a desired ratio in one reaction stage, in which the loss caused by the formation of cyclohexane is repressed and in which, furthermore, the service life of the catalyst used is improved.

SUMMARY OF THE INVENTION

It has now been found, surprisingly, that the requirements mentioned are fulfilled by using the supported ruthenium catalyst characterized below, which has an $Al_2O_3$ support containing compounds of rare earth metals (III subgroup of the periodic system of the elements) and of manganese.

The invention relates, accordingly, to a ruthenium catalyst which is supported on $Al_2O_3$ treated with compounds of rare earth metals (III.subgroup of the periodic system of the elements) and of manganese and which has a ruthenium content of 0.05–5% by weight, preferbly 0.05–3% by weight and particularly preferably 0.1–2% by weight, the percentages relating to the total weight of the catalyst.

The catalyst according to the invention contains, as the support, $Al_2O_3$ which has been treated with compounds of rare earth metals (III.subgroup of the period system of the elements) and of manganese. In particular, the α-modification and the γ-modification, particularly preferably the γ-modification, are suitable as the $Al_2O_3$. The support has a content of rare earth metal and manganese together of 0.05–8% by weight, preferably 0.2–5% by weight, relative to the total weight of the catalyst. The ratio by weight of rare earth metal to manganese is 5:1–1.5, preferably 10:9–1:2. Rare earth metals are understood to mean the elements of the III, subgroup of the periodic system, such as scandium, yttrium, lanthanum and the lanthanides. They are preferably understood to mean yttrium, lanthanum, cerium, praseodymium, neodymium and dysprosium, particularly preferably cerium and lanthanum and very particularly preferably cerium. The cerium can be associated in this respect with other lanthanides, for example with lanthanum, praseodymium, neodymium or dysprosium, or with yttrium. An association of this type is, moreover, familiar to those skilled in the art for all the rate earth metals mentioned.

The preparation of the catalysts according to the invention can be effected by applying compounds of the rare earth metals and of manganese to $Al_2O_3$ in the form of extruded pieces, pills or spheres having dimensions of about 2–10 mm, heating the support thus charged, after drying, to 200°–450° C. and then impregnating or spraying it with a solution of a ruthenium salt, after which there is a further drying phase.

The application of compounds of the rare earth metals and of manganese to the catalyst support can be effected, for example, merely by impregnating or spraying with suitable salts of the rare earth metals and of manganese, followed by a drying phase and the heating phase at 200°–450° C. which has been mentioned. In the course of this the salts of the rare earth metals and of manganese are converted into compounds which adhere firmly to the catalyst support. The application of compounds of the rare earth metals and of manganese can, however, also be effected by the joint precipitation of a mixture of rare earths and manganese hydroxides from salts of rare earths and manganese on the support by means of an alkali metal hydroxide solution or ammonia, followed, if appropriate, by extracting the soluble constituents by washing with water. In particular, the sulphates, chlorides, acetates and/or nitrates of the elements mentioned are suitable as rare earth and manganese salts.

After the application of the rare earth and manganese compounds and, if appropriate, after the precipitation described (and the associated extraction by washing of water-soluble compounds), the support treated in this way is first dried before it is heated at higher temperatures (about 200°–450° C., preferably 250°–430° C.). This heating is carried out in a period of 1–120 hours. During this time the temperature can be increased within the range mentioned from lower to higher values.

After the heat treatment described, the catalyst support which has been charged with compounds of the rare earth metals and of manganese is impregnated with a solution containing ruthenium. This can be effected by impregnating or spraying the ruthenium, for example in the form of aqueous solutions of the chloride, nitrate, acetate or another suitable salt, onto the support, followed by drying. However, it is also possible, before the drying, to treat the support impregnated with ruthenium with a solution of the abovementioned basic compound, when the ruthenium is precipitated in the form of oxide or hydroxide. This is also followed by drying. A catalyst, according to the invention, of this type is then available in principle for use. Preferably, however, before it is used and particularly preferably after it has been arranged in the hydrogenation reactor, it is activated by treatment with hydrogen at a temperature of 150°–350° C. After or before the activation, it can be desirable to remove, by water washing, anions, such as chloride, nitrate, acetate or others, and, if appropriate, the cations of the basic compounds used for the precipitation.

It is also possible, however, first to impregnate the catalyst support charged with the compounds of rare earth metals and of manganese with a solution of one of the basic compounds mentioned, then to dry it and to apply solutions of ruthenium salts to the catalyst support which has been rendered basic and pretreated in this way, in the course of which the precipitation of the ruthenium in the form of its oxide or hydroxide takes place at the moment of impregnation. Here too, the catalyst is, in principle, ready for use after a final drying, but it can preferably be activated beforehand in the manner described by means of hydrogen at the temperature mentioned.

A catalyst which has been charged with basic compounds in order to precipitate the ruthenium as oxide or hydroxide is, in principle, ready for operation in the presence of the residues of such alkaline compounds. It is preferable, however, to carry out the described water wash.

The impregnation or the spraying of the $Al_2O_3$ support with the substances mentioned and the equipment required for this purpose are known to those skilled in the art; the formulation of the desired charging by selecting the amount and concentration of the solutions of the elements mentioned is also known.

The catalysts according to the invention can be employed in an excellent manner for the ring hydrogenation of optionally substituted anilines under elevated pressure. Particularly surprisingly, it is possible, using the catalysts according to the invention, to alter, as a function of the hydrogenation temperature, the amount of dicyclohexylamine formed at the same time as compared with the monocyclohexylamine, which makes possible the selective preparation of dicyclohexylamine in fairly large amounts. Compared with a pure supported ruthenium catalyst not prepared with compounds of the rare earth metals and of manganese, the catalysts according to the invention exhibit the high service life required for continuous industrial processes.

A process for the preparation of a mixture of optionally substituted cyclohexylamine and optionally substituted dicyclohexylamine by the hydrogenation of optionally substituted aniline with hydrogen in the presence of the catalyst described above is thus possible in accordance with the invention, the process being carried out in the region of 80°–240° C., preferably 100°–220° C. and under a pressure of 50–500 bar, preferably 100–400 bar and particularly preferably 150–350 bar.

It is possible, in accordance with the invention, to obtain the amount of dicyclohexylamine desired by varying the temperature, higher hydrogenation temperatures corresponding to a higher proportion of dicyclohexylamine and conversely. Thus at a reaction temperature in the neighborhood of about 100° C., for example, only up to about 4% by weight of dicyclohexylamine is obtained in the mixture of ring-hydrogenated amines, whereas at hydrogenation temperatures in the region of about 200° C., the hydrogenated amines can be present in a ratio in which up to over 50% is in the form of dicyclohexylamine.

The hydrogenation over the catalysts according to the invention can be carried out discontinuously or continuously, preferbly continuously for industrial purposes; in this case the process is carried out in the trickle phase using a fixed catalyst bed. The catalyst loading is adjusted to a rate of 0.05–2, preferably 0.1–1 and particularly preferably 0.15–0.6 kg of aniline per liter of catalyst per hour. It is possible to compensate for a slight alteration in the proportion of dicyclohexylamine achieved as the result of a change in the activity of the catalyst in the course of fairly long reaction periods, by a slight adjustment in the reaction temperature or the other parameters. These ratios can be followed by means of analysis of the reaction mixture.

Suitable feed materials in accordance with the following reaction equation are aniline and substituted anilines, which are converted into the corresponding cyclohexylamines and dicyclohexylamines:

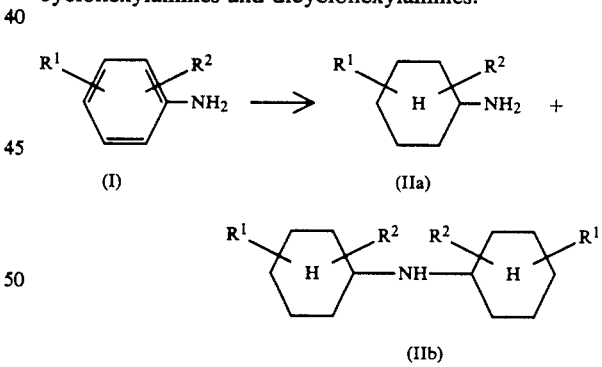

The radicals $R^1$ $R^2$ independently of one another denote hydrogen, $C_1$–$C_4$-alkyl or $C_1$–$C_4$-alkoxy. The following are examples of the alkyl or alkoxy substituents mentioned: methyl, ethyl, propyl, isopropyl, butyl, isobutyl, methoxy, ethoxy, propoxy, isopropoxy, butoxy or isobutoxy. The substituents mentioned preferably have 1–2 C atoms and, particularly preferably, are methyl or methoxy. It is also preferable for one of the substituents $R^1$ and $R^2$ to denote hydrogen, while the other substituent denotes alkyl or alkoxy within the range mentioned.

It is particularly preferable for the process to be directed towards the ring-hydrogenation of unsubstituted aniline.

Cyclohexylamines and dicyclohexylamines within the range of meaning mentioned are used for the preparation of anti-ageing agents for rubbers and plastics, as an anti-corrosion agent and as precursors for plant protection agents and textile auxiliaries.

EXAMPLE 1

200 g of a commercially available $\gamma$-$Al_2O_3$ having a specific surface area of 350 $m^2$/mg and a pellet diameter of 2 to 6 mm were impregnated with a solution which had been prepared from 12.4 g of $Ce(NO_3)_3.6H_2O$,
18.28 g of $Mn(NO_3)_2.4H_2O$ and
50 g of water.

The impregnated $Al_2O_3$ was dried in a waterpump vacuum for 18 hours at 120° C. and was then heat-treated at 400° C. for 3 hours. The catalyst support thus prepared was impregnated with 70 g of an aqueous solution of $RuCl_3$ containing 2 g of Ru. The moist catalyst was dried in a waterpump vacuum for 18 hours at 120° C. and was activated in a stream of hydrogen (100 l/hour of $H_2$) for 3 hours at 350° C.

EXAMPLE 2

25 ml (19 g) of the catalyst prepared in accordance with Example 1 were used for hydrogenating aniline in a 250 ml shaking autoclave equipped with a perforated basket mounted centrally in its interior and firmly attached to the autoclave and packed with the catalyst. This charge of catalyst was used to hydrogenate 50 g of aniline in each case under a hydrogen pressure of 280 bar and at various temperatures. The hydrogenation time in all the tests of this series was 3 hours. The hydrogenation products were analyzed by gas chromatography and had the following composition, depending on the hydrogenation temperature:

| Temperature (°C.) | 200 | 160 | 110 |
|---|---|---|---|
| Dicyclohexylamine (%) | 58.3 | 7.6 | 3.6 |
| By-products (%) | 0.3 | 0.2 | 0.1 |
| Cyclohexylamine (%) | remainder | remainder | remainder |

EXAMPLE 3

In further hydrogenation tests, 60 ml (51.3 g) of the catalyst prepared in Example 1 were placed in a vertically mounted pressure tube (diameter 14 mm and length 70 cm), heated by means of an oil thermostat. The temperature was monitored at several measuring points. The average value was quoted in each case. Possible hot spots above the first measuring point could not be recorded. The void volume was filled with fine sea sand (0.2 to 0.3 mm). Aniline and hydrogen were passed downwards onto the catalyst at 280 bar. The liquid trickled downwards over the catalyst into a separator, 20 liters/hour of hydrogen were released at the head of the separator. The aniline throughput corresponded to a catalyst loading of 0.25 to 0.27 g of aniline/ml of catalyst × hour and was kept constant.

The hydrogenation product was withdrawn from the separator at regular intervals of time and was analysed. Over a test period of more than 16 months the following product composition was obtained as a function of the running time and the reaction temperature:

| Running time (hours) | Temperature (°C.) | DHA* (%) | CHA* (%) | By-products (%) |
|---|---|---|---|---|
| 164 | 188 | 64.0 | 35.5 | 0.5 |
| 283 | 107 | 4.3 | 95.6 | 0.1 |
| 1069 | 190 | 65.9 | 33.5 | 0.6 |
| 1729 | 111 | 4.4 | 95.4 | 0.2 |
| 2278 | 190 | 64.8 | 34.6 | 0.6 |
| 5925 | 180 | 64.6 | 34.6 | 0.8 |
| 7262 | 110 | 4.3 | 95.6 | 0.1 |
| 8506 | 110 | 4.2 | 95.7 | 0.1 |
| 10065 | 201 | 53.6 | 45.8 | 0.6 |
| 11608** | 200 | 61.3 | 38.1 | 0.6 |
| 11702** | 111 | 3.3 | 96.6 | 0.1 |
| 11845 | 191 | 68.7 | 30.6 | 0.7 |

*DHA = dicyclohexylamine; CHA = cyclohexylamine
**In the period of time between 11400 and 11700 hours of operation the hydrogenation was carried out at a catalyst loading of 0.4 g/ml of catalyst × hour.

EXAMPLE 4

In a further hydrogenation test, 1000 ml (800 g) of a catalyst prepared in accordance with Example 1 were put into a vertically mounted pressure tube (diameter 40 mm and length 110 cm) the temperature of which could be controlled. Aniline and hydrogen were passed downwards onto the catalyst at 280 bar. The liquid trickled over the catalyst, and hydrogenation took place. 200 l/hour of hydrogen were released from the head of the liquid separator. The rate at which aniline was fed in continuously corresponded to a catalyst loading of 0.21 or 0.41 g of aniline/ml of catalyst × hour. When stationary reaction conditions had been reached the following product composition was obtained as a function of the hydrogenation temperature:

| Temperature (°C.) | 190–200 | 170–180 |
|---|---|---|
| Dicyclohexylamine (%) | 34.3 | 23.2 |
| By-products (%) | 0.3 | 0.2 |
| Cyclohexylamine (%) | remainder | remainder |
| Catalyst loading (g/ml × hour) | 0.41 | 0.21 |

EXAMPLE 5

200 g of a commercially available $\gamma$-$Al_2O_3$ having a specific surface area of 350 $m^2$/g and a pellet diameter of 2–6 mm were impregnated with a solution whch had been prepared from 12.4 g of $Ce(NO_3)_3.6H_2O$,
18.28 g of $Mn(NO_3)_2.4H_2O$ and
60 g of water.

The impregnated $Al_2O_3$ was then mixed with 79 g of 10% strength ammonia solution. The catalyst support which had been treated in this way was washed with running water until free from nitrate. The catalyst support was first dried for 3 hours at 90° C. and was then heat-treated for 3 hours at 400° C.

The heat-treated catalyst support was impregnated with 60 g of an aqueous solution of $RuCl_3$ containing 2 g of ruthenium. Drying was then carried out in stages: first for 3 hours at 90° C. and then at 120° C. until constant weight was attained. The catalyst prepared in this way was activated in a stream of hydrogen (100 l/hour of $H_2$) for 3 hours at 200° C.

For the continuous hydrogenation of aniline, 60 ml (50.8 g) of the catalyst thus prepared were packed into a pressure tube and the procedure was as described in Example 3. The catalyst loading was again adjusted to 0.25 g of aniline/ml of catalyst×hour under a hydrogen pressure of 280 bar. The following product composition was obtained under stationary reaction conditions:

| Temperature (°C.) | 187 | 110 |
|---|---|---|
| Dicyclohexylamine (%) | 59.02 | 2.90 |
| By-products (%) | 0.16 | 0.05 |
| Cyclohexylamine (%) | 40.82 | 97.05 |

EXAMPLE 6

200 g of a commercially available $\gamma$-$Al_2O_3$ having a specific surface area of 350 m$^2$/g and a pellet diameter of 2-6 mm were impregnated with a solution prepared from 12.5 g of $La(NO_3)_3.6H_2O$,
18.3 g of $Mn(NO_3)_2.4H_2O$ and
50 g of water.

The impregnated $Al_2O_3$ was dried and heat-treated for 3 hours at 400° C. 50 g of the catalyst support thus prepared were impregnated with 60 g of an aqueous solution of $RuCl_3$ containing 0.5 g of ruthenium, and were then dried at 120° C. Finally, the catalyst was reduced in a stream of hydrogen (100 l/hour of $H_2$) for 2 hours at 250° C.

25 ml (20.5 g) of the catalyst thus prepared were employed for the hydrogenation of 50 g of aniline in the manner described in Example 2. The hydrogen pressure was likewise 280 bar. The hydrogenation products were analysed by gas chromatography and exhibited the following composition as a function of the hydrogenation temperature:

| Temperature (°C.) | 200° | 160 | 120 |
|---|---|---|---|
| Dicyclohexylamine (%) | 40 | 7.3 | 3.9 |
| By-products (%) | 0.25 | 0.25 | <0.1 |
| Cyclohexylamine (%) | remainder | remainder | remainder |

What is claimed is:

1. A ruthenium catalyst which is useful in the hydrogenation of anilines to cyclohexylamines and dicyclohexylamines wherein said catalyst is supported on $Al_2O_3$ and wherein said $Al_2O_3$ support contains at least one rare earth metal and manganese and said catalyst having a ruthenium content of 0.05-5% by weight, relative to the total weight of catalyst.

2. The catalyst according to claim 1, wherein the ruthenium content is 0.05-3% by weight, relative to the total weight of the catalyst.

3. The catalyst according to claim 2, wherein the ruthenium content is 0.1-2% by weight, relative to the total weight of the catalyst.

4. The catalyst according to claim 1, wherein the at least one rare earth metal are yttrium, lanthanum, cerium, praseodymium, neodymium or dysprosium.

5. The catalyst according to claim 4, wherein the at least one rare earth metal are cerium or lanthanum.

6. The catalyst according to claim 5, wherein the rare earth metal is cerium.

7. The catalyst according to claim 1, wherein the at least one rare earth metal and manganese are present in a total content of 0.05-8% by weight relative to the total weight of the catalyst, and the ratio by weight of the at least one rare earth metal to manganese is adjusted to 5:1-1:5.

8. The catalyst according to claim 7, wherein the total content of the at least one rare earth metal and of manganese is 0.2-5% by weight, relative to the total weight of the catalyst.

9. The catalyst according to claim 7, wherein the ratio by weight of the at least one rare earth metal to manganese is adjusted to 10:9-1:2.

* * * * *